United States Patent
Adams et al.

(10) Patent No.: US 10,217,091 B2
(45) Date of Patent: Feb. 26, 2019

(54) PRE-PROVISIONING ELECTRONIC BANKING FILES

(71) Applicant: Bank of America Corporation, Charlotte, NC (US)

(72) Inventors: Brian F. Adams, Charlotte, NC (US); Sharon P. Midkiff, Chicago, IL (US); Sorin Cismas, Southlake, TX (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 689 days.

(21) Appl. No.: 14/621,485

(22) Filed: Feb. 13, 2015

(65) Prior Publication Data

US 2016/0239812 A1  Aug. 18, 2016

(51) Int. Cl.
G06Q 20/02 (2012.01)
G06Q 20/10 (2012.01)
G06Q 20/00 (2012.01)
H04L 12/26 (2006.01)

(52) U.S. Cl.
CPC ........... *G06Q 20/023* (2013.01); *G06Q 20/00* (2013.01); *G06Q 20/108* (2013.01); *H04L 43/00* (2013.01)

(58) Field of Classification Search
CPC ....................................... G06Q 20/00–20/108
USPC ..................................................... 705/35–45
See application file for complete search history.

(56) References Cited

U.S. PATENT DOCUMENTS

| | | |
|---|---|---|
| 5,974,248 A | 10/1999 | Graef |
| 7,003,579 B1 | 2/2006 | Johansson et al. |
| 7,219,106 B2 | 5/2007 | Chung |
| 7,660,876 B2 | 2/2010 | Mangalvedhekar |
| 7,889,236 B2 | 2/2011 | Kusaka et al. |
| 8,023,007 B2 | 9/2011 | Kusaka et al. |
| 8,121,944 B2 * | 2/2012 | Norman ................. G06Q 20/10 705/39 |
| 8,446,474 B2 | 5/2013 | Kusaka et al. |
| 8,522,202 B2 * | 8/2013 | Gonzales, II ....... G06F 11/3664 717/115 |
| 2007/0100748 A1 * | 5/2007 | Dheer .................... G06Q 20/10 705/39 |
| 2012/0011067 A1 * | 1/2012 | Katzin ................ G06Q 20/027 705/44 |
| 2012/0198292 A1 | 8/2012 | Yuzurihara et al. |
| 2013/0246203 A1 * | 9/2013 | Laracey ............ G06Q 30/0253 705/21 |
| 2014/0279403 A1 * | 9/2014 | Baird ................... G06Q 20/322 705/38 |
| 2014/0365776 A1 * | 12/2014 | Smets ................... H04L 9/0841 713/171 |
| 2015/0154570 A1 * | 6/2015 | Dheer .................... G06Q 20/10 705/44 |

* cited by examiner

*Primary Examiner* — Narayanswamy Subramanian
(74) *Attorney, Agent, or Firm* — Weiss & Arons LLP; Michael A. Springs, Esq.

(57) ABSTRACT

Apparatus and methods for pre-provisioning a generic connection to the bank to allow clients to transmit electronic test files. The test files may include one or more transaction requests submitted for processing by the client. Methods may evaluate infrastructure for processing the requested transactions. Methods may include determining a feasibility of the establishing the infrastructure. A phantom acknowledgement may be transmitted to the client before establishing the infrastructure to process the requested transactions.

5 Claims, 8 Drawing Sheets

| Phantom Acknowledgment Reciept | |
|---|---|
| Client 502 | ABC Corp. |
| Requested Services 504 | 1) ACH Transfer<br>2) Credit Card Processing |
| Request Data 506 | Received @ 2:31pm<br>Dec. 4. 2014<br>Bank Processing Station X<br>By John Doe (#1234)<br>Electronic File (test-data. txt) |
| Estimated Processing Time 508 | Set up - 5 hrs<br>Processing - 1 hr |
| ACH Time Stamp 510 | Transmitted to: info@ABC_Corp.com<br>Dec. 3, 2014 10:10am |

PRE-PROVISIONING ELECTRONIC BANKING FILES

FIELD OF TECHNOLOGY

This application relates to providing a pre-provisioning data solution.

BACKGROUND OF THE DISCLOSURE

Banks may offer clients different services. One of services offered is to initiate one or more banking transactions by submitting an electronic file to the bank. The client may transmit the electronic file using an online portal of the bank, email, or any other suitable method. Contents of the electronic file may be specially formatted. The contents may be formatted based on the type of transaction requested. Some files may include a plurality of different transactions. Each transaction listed in the file may be formatted differently.

The client may access the online portal using a user interface. For example, the client may wish to process a number of Automated Clearing House (ACH) transfers to pay multiple invoices.

To process transactions based on an electronic file, the bank typically establishes an electronic connection that links the client to infrastructure for processing the transactions. The electronic connection may be accessible to the client through a user interface of the portal. The electronic connection may link the client, via the interface and portal to various types of payment networks. A payment network may be viewed as the "rails" used to transfer funds between the client and a target. The target may be another account of the client, a vendor, a government or any suitable target.

The portal may offer the capability to process a variety of different transaction types using various payment networks. The portal may offer the capability to process more transaction types than the client may regularly utilize.

The bank that operates the portal may establish electronic connections to the payment networks requested by the client. The bank may establish electronic connections to one or more payment networks used at least once by the client. The bank may offer the client an ability to utilize payment networks for which an electronic connection has not yet been established on behalf of the client.

The client may request a transaction that utilizes a payment network which the bank has not yet linked to the client or user interface of the client. It would be desirable to provide the client with banking services that, from the client's perspective, do not distinguish between different transactions requested by the client. Specifically, it would be desirable, from the client's perspective, that a requested transaction be processed in a consistent manner regardless of whether an electronic connection has yet to be established on behalf of the client or already exists.

For at least this reason, it would be desirable to provide pre-provisioning of electronic banking files.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

A bank may offer various banking services to clients through an online portal. The bank may provide the client with a user interface to access the online portal. The user interface may provide the client access to banking services offered by the bank. The user interface may provide the client access to a subset of banking services offered by the bank.

If a client requests an additional service, the bank may provide access to the requested service. Providing access to the requested service may include customizing the user interface of the client.

Customizing the user interface may include a visible change to the user interface. For example, the bank may add a tab to a client's user interface. When the client clicks on the tab, the client may be provided access to the requested banking service.

Customizing the user interface may include a change to "back end processing" of the portal. The change to back end processing may not be visible to the client. The change back end processing may include establishing a connection between the online portal and infrastructure utilized by the bank to process requested transactions. The connection may be provided using software, hardware and/or a combination of hardware and software.

The infrastructure may be operated by the bank. The bank may contract for access to the infrastructure from third parties. The infrastructure may include a payment network. Payment networks may include internal networks, external networks and hybrid networks. Internal networks may include networks operated by the bank. For example, an internal payment network may be used to transfer funds between different accounts at the bank. The different accounts may be located in different countries and may be associated with different currencies. The bank may control access to payment networks that facilitate such transfers.

External networks may include payment networks that are operated by service providers that are not under the control of the bank. External networks may include Automated Clearing House (ACH), VisaNet or FedWire.

Hybrid payment networks may include any suitable combination of internal and external payment networks. Hybrid networks may be utilized to perform multi-step transactions that include an internal bank transfer and then a transfer to an account held outside the bank.

A change to back end processing may include establishing a connection between a user interface of the client and a payment network. The back end change may include the bank establishing the connection based on a transaction requested in an electronic file submitted by the client.

The user interface of the online portal may accept client requests for transaction services that are not visibly accessible to the client through the user interface. The client request may include transmitting an electronic file to the bank. The electronic file may include the client's request. The request may include an exemplary transaction instruction.

The client may provide transaction instructions for a plurality of transaction requests in the electronic file. For example, in one file, the client may wish to provide the bank instructions for multiple transactions. Each client transaction request may utilize one or more different payment networks.

The bank may examine contents of the electronic file received from the client. The infrastructure may include computer software tools for examining contents of the electronic file. The examination may identify one or more payment networks that may be utilized to process one or more of the transaction requests. The payment networks may be identified based on an expected result of the transaction requested by the client.

The examination may be performed by an examination algorithm. The examination algorithm may include executable software. The contents of the electronic file may be examined when the examination algorithm is executed by a processor on a computer system or server.

The infrastructure may include computer software for "scrubbing" a client's electronic file. The scrubbing may verify that an electronic file submitted by client includes transaction instructions written in syntax expected by the bank and/or payment networks. The scrubbing may be performed by a scrubbing algorithm.

The examination algorithm may identify two or more different scrubbing algorithms. The two or more scrubbing algorithms may be identified based on two or more payment networks identified for processing a transaction request in the electronic file.

For example, the bank may allow a client to provide a transaction request in pseudo code or natural language. The scrubbing algorithm may parse the client's transaction request. The parsing may identify one or more payment networks that may be utilized to process the client's transaction request. The scrubbing algorithm may identify a syntax algorithm.

The syntax algorithm may be associated with a specific payment network. The syntax algorithm may evaluate whether the client's transaction request includes terms that conform to a pre-determined syntax expected by a specific payment network.

The scrubbing algorithm may extract one or more terms from the client's transaction request. Based on the specific payment networks that would be utilized to process transaction request, the scrubbing algorithm may pass the one or more terms to one or more syntax algorithms. Each syntax algorithm may evaluate whether the terms included in the client's transaction request conforms to the pre-determined syntax expected by a specific payment network.

A payment network may be operated by a third party, such as another financial institution. Each payment network operator may require that a transaction request conform to a different syntax.

When a transaction request includes use of two or more payment networks, two or more scrubbing algorithms may be applied to the transaction request. Each scrubbing algorithm may examine at least a portion of the syntax of the transaction request that provides instructions to one of the payment networks. Each scrubbing algorithm may identify one or more terms in the client's transaction request. Each scrubbing algorithm may identify terms that may be passed to a specific payment network.

A client's transaction request may involve access to a payment network not currently available to the client. The payment network may not be available to the client from within the online banking portal. In some embodiments, other client's may have access to the payment network. In some embodiments, the client's transaction request may be the first request received by the bank for access, via the online portal, to a specific payment network.

Providing the client access to the requested payment network may include establishing an electronic connection that links the client to infrastructure for completing the transaction requests. For example, to process a client transaction request, the bank may need to establish a connection between the user interface of the client and one or more examination algorithms, scrubbing algorithms and/or syntax algorithms. To process the client transaction request, the bank may need to establish a connection between the client's user interface and one or more payment networks.

The one or more connections that need to be established by the bank may not involve participation of the client. The connections may be established by the bank without assistance from the client. From the client's perspective, when a new transaction request is submitted to the bank, the client may expect that the new request be treated similarly to a transaction request regularly submitted by the client for processing.

For example, a client may regularly submit transaction requests that utilize a first payment network. The bank may have already established the infrastructure necessary to process the regularly submitted transaction request. In view of the client's historical transaction requests and the banks establishment of the necessary infrastructure, the bank may be confident in its ability to complete additional transaction requests that utilize the first payment network.

In response to receiving a client transaction request that utilizes the first payment networks, the bank may transmit an electronic acknowledgement receipt (hereinafter, "ACK") to the client. The ACK may confirm that the bank has received the transaction request. The ACK may provide an estimated time when the transaction request may be completed. The ACK may inform the client of one or more payment networks that may be utilized to complete the transaction request. The ACK may include any suitable information regarding the processing of the transaction request.

The ACK may be made available to the client from within the client's user interface of the online portal. The client may access the ACK via the user interface.

The bank may receive a transaction request from the client that utilizes a second payment network. The bank may not have established the infrastructure for the client to utilize the second payment networks. To process the client's request, the bank may need to establish the infrastructure.

The examination and/or scrubbing algorithms may identify the second payment networks. The bank may determine whether another client has utilized the second payment network now being requested. If another client has utilized the second payment network, the bank may issue an ACK to the requesting client before establishing the infrastructure.

The bank may issue a "phantom" ACK to the currently requesting client as a result of having already established the infrastructure for the second payment network on behalf of one or more other clients.

By issuing the phantom ACK to the requesting client before establishing the infrastructure, the requesting client may feel that the bank responds to transaction requests in a similar fashion. After issuing the ACK to the requesting client, the bank may establish the infrastructure to process the requested transaction.

The ACK issued to the requesting client may take account of "set-up" time to establish the infrastructure. For example, the bank may estimate that it can fulfill a requested transaction within one-hour.

If infrastructure has been established prior to receiving a transaction request, the ACK may indicate that the bank expects the transaction request to be fulfilled within one-hour. For such a transaction request, the ACK issued to the requesting client may indicate that the bank estimates the transaction request will be fulfilled within one-hour.

If infrastructure has not been established, the phantom ACK may indicate that the bank estimates the transaction request will be fulfilled with two-hours. The extra one-hour may include time to establish the infrastructure to process the transaction request.

The bank may be unable to identify another client that has utilized the now requested payment network. In such scenarios, the bank may delay issuance of the ACK. The bank may delay issuance of the ACK until the bank evaluates a feasibility of establishing the needed infrastructure.

In some embodiments, the bank may issue an abbreviated ACK. The abbreviated ACK may inform the requesting client that the bank is evaluating a feasibility of establishing the infrastructure to process the requested transaction. The abbreviated ACK may provide a time estimate when the requesting client may expect to receive a result of the feasibility evaluation.

In some embodiments, a client may contact the bank before submitting a transaction request. For example, the client may contact a customer service representative of the bank. The client may ask whether the bank may process a specific transaction request.

In response to receiving the client's transaction request, the bank may evaluate a feasibility of establishing infrastructure to process the client's transaction request. In response to determining that it would be feasible to establish the infrastructure, the bank's customer service representative may invite the client to transmit an electronic file that includes the transaction request.

In response to receiving the transaction request, the bank may transmit a phantom ACK to the client. The bank may transmit the phantom ACK before actually establishing the infrastructure. The bank may establish the infrastructure after transmitting the phantom ACK to the client. The bank may establish the infrastructure for processing the requested transaction to meet a timeframe for completing the client's transaction request. The timeframe may be specified in the phantom ACK.

A phantom ACK transmitted before establishing infrastructure to process a transaction request may be considered a phantom ACK. The ACK may be considered "phantom" because at the time the ACK is transmitted, the bank may be unable to process the requested transaction on behalf of the requesting client. The bank may nonetheless transmit the phantom ACK as a result of evaluating that infrastructure to process the client's request may be established to process the transaction request within a pre-determined timeframe. The pre-determined timeframe for processing the transaction request may be specified by the client. The bank may set the pre-determined timeframe.

Transmitting a phantom ACK may allow the requesting client, from its perspective, to view the requested transaction as having been completed. Furthermore, in response to receiving the phantom ACK, the requesting client may feel confident that the bank is attentive and response to the client's specific transaction requests.

In some embodiments, the bank may determine that it is feasible to establish the infrastructure to process the client's transaction request. Before transmitting the phantom ACK to the client, the bank may apply one or more of the examination algorithms, the scrubbing algorithms and/or syntax algorithms to the transaction request.

For example, the requesting client may not have utilized a specific payment network via the online portal. However, the bank may nonetheless deploy algorithms for processing transaction request. The algorithms may determine that the bank has previously established infrastructure for using the specific payment network for other clients. The algorithms may determine that the bank has established infrastructure for using the specific payment network in connection with other bank tools. Based on the infrastructure established for other clients or other transaction request, the algorithm may determine that it would be feasible to establish the infrastructure on behalf of the currently requesting client.

Applying the algorithms to a transaction request may also identify syntax or other errors in the transaction request. The requesting client may be prompted to cure the identified errors and resubmit the transaction request. If the resubmitted transaction request is free of errors and the bank has not yet established the infrastructure to process the request for the client, the bank may transmit a phantom ACK to the requesting client.

Apparatus and methods for pre-provisioning test data are provided. Apparatus may include a computer program product stored by one or more computer-readable storage media having computer-readable program code, or instructions, embodied in or on the storage media. The instructions, when executed by a processor on a computer system, may perform the methods.

The test data may be directed to a plurality of banking products and/or across a plurality of banking protocols. The banking products and/or protocols may be made accessible via an online banking portal. The online banking portal may be operated by a bank.

Methods may include using a receiver, receiving a request from a client to initiate an automated clearing house ("ACH") transaction. In response to receiving the request for the ACH transaction, methods may include determining whether the requesting client has processed at least one ACH transaction via the portal prior to receiving the request.

When the requesting client has processed at least one ACH transaction, methods may include requesting that the client transmit an electronic file that includes the at least one ACH transaction. As a result of having processed ACH transactions on behalf of the client in the past, infrastructure may be in place for processing future ACH transactions received from the client. Infrastructure may include a pre-existing dictionary for formulating ACH transactions based on contents of an electronic file transmitted by the client. The contents of the file may include formatting, terms or phrases utilized by the client.

In response to receiving the electronic file, methods may include transmitting an "actual" ACK. The actual ACK may be transmitted to the client. The actual ACK may include a confirmation that the bank will process the requested ACH transaction within a pre-determined time period.

Methods may include initiating the requested ACH transaction. Methods may include using a transmitter, transmitting the actual ACK to the client.

When the requesting client has not processed at least one ACH transaction prior to receiving the transaction request, methods may include using the transmitter, transmitting a phantom ACK to the client in response to receiving the electronic file. The phantom ACK may be transmitted in response to receiving the electronic file from the client and before initiating the requested ACH transaction.

From the client's perspective, a phantom ACK may be no different from an actual ACK. After transmitting the phantom ACK to the client, methods may include configuring the portal to process the requested ACH transaction on behalf of the client. The bank may need to configure the portal to process the requested ACH transaction. The bank may initiate the requested ACH transaction after transmitting the phantom ACK and after configuring the portal to process the requested ACH transaction.

In some embodiments, the bank may only transmit the phantom ACK after reviewing contents of the ACH or other transaction request. Before transmitting the phantom ACK, the bank may evaluate a feasibility of processing future transaction requests received from the client. The bank may transmit the phantom ACK when the bank determines that it is feasible to establish infrastructure to process the requested transaction for the requesting client.

Methods may include establishing an electronic connection between a user interface of the client (accessible via the portal) and at least one payment network. The bank may provide the client access to one or more payment networks using the online portal. In response to a transaction request, the bank may add a connection that allows the client to access a payment network. Establishing the electronic connection may include providing access to one or more services offered by the payment network through the client's user interface.

Methods may include providing the client access to the payment network by adding a tab to the client's user interface.

Before generating a phantom ACK, methods may include verifying syntax of a transaction request. When the syntax of the requested ACH transaction is formatted for an ACH transaction, methods may include generating a phantom ACK before initiating the requested ACH transaction. Based verifying the format of the request, the bank may assume a risk of guaranteeing processing of the ACH transaction within a pre-determined timeframe. The phantom ACK may inform the client that the bank has guaranteed the requested ACH transaction.

When a requested ACH transaction received from the client is not formatted for an ACH transaction, the phantom ACK may not be transmitted to the client. When a requested ACH transaction received from the client is not formatted for an ACH transaction, methods may include transmitting an error message to the client. The error message may include proper syntax for the ACH transaction.

An appearance of the phantom ACK may identical to the actual ACK. The client may not notice a difference between an actual ACK and a phantom ACK. By maintaining a similar or identical appearance, the bank may maintain a notification scheme that is consistent across different services provided to clients. By maintaining a similar or identical appearance, the bank may avoid involving the client in details explaining why, from the banks perspective, to process the requested transaction the bank may need to establish additional infrastructure.

Methods may include using a receiver, receiving a request from a client to initiate a banking transaction. The request may be received via user interface utilized by the client to access an online banking portal.

In response to receiving the transaction request, methods may include determining whether the bank has infrastructure in place to process the transaction request on behalf of the client. Methods may include determining whether the user interface accessible to the client includes infrastructure for processing the transaction request.

The bank may have previously established the infrastructure prior to receiving the transaction request. When the infrastructure is already in place, the methods may include requesting that the client transmit an electronic file that includes the requested transaction.

In response to receiving the electronic file, methods may include transmitting to the client an actual ACK. The actual ACK may be transmitted when the bank determines that infrastructure for processing the client's transaction request is already in place.

The actual ACK may include confirmation that the bank will process the requested transaction within a pre-determined time period.

When the bank has not yet established infrastructure to process a received transaction request, methods may include using the transmitter, transmitting a phantom ACK to the client. The phantom ACK may provide an estimated and/or guaranteed time by when the bank will process the requested transaction. After transmitting the phantom ACK to the client, methods may include establishing the infrastructure to process the requested banking transaction. Methods may include processing the requested transaction after establishing the infrastructure.

The requesting client may be a first client. The first client may not have previously processed the type of transaction now requested. Before generating a phantom ACK, methods may include determining whether infrastructure has been established on behalf of a second client. The second client may have requested the transaction type before the first client. The bank may have established the infrastructure to process the transaction type on behalf of the second client. The bank may determine that it is feasible to establish the infrastructure on behalf of the first client. The phantom ACK may be transmitted after evaluating the feasibility.

Methods may include transmitting the phantom ACK to the first client when the infrastructure has been established on behalf of the second client. When the bank determines that the infrastructure has been established or deployed for the second client, the bank may be confident that the infrastructure may be established or deployed within a pre-determined timeframe for the first client. The bank may feel confident issuing a phantom ACK to the first client.

When the infrastructure has not been established for a second client, the methods may include suspending transmission of the phantom ACK. Before transmitting the phantom ACK the bank may attempt to establish the infrastructure on behalf of the first client. After successfully establishing the infrastructure, an actual ACK may be transmitted to the first client.

Establishing infrastructure may include providing access to one or more payment networks from a user interface of a client. An online banking portal may not be configured to provide a client access to all banking services and/or protocols offered by a bank. In response to receiving a transaction request, the bank may establish the infrastructure to provide the requesting client access to one or more banking services and/or protocols.

Before transmitting a phantom ACK the bank may identify one or more payment networks to process the transaction request. For each payment network, methods may include verifying syntax of at least a portion of the request associated with the payment network.

The verification may confirm that the bank may convert the transaction request provided by the client into syntax expected by a payment network.

A client that requests a transaction may be one of a plurality of clients. A payment network may be one of a plurality of payment networks utilized to process transactions. After transmitting the phantom ACK to the requesting client, methods may include, generating a map of connections linking the plurality of payment networks accessible to the plurality of clients.

The map may be used to determine whether the bank has previously established infrastructure to process a currently requested transaction. If the map shows that the bank has previously established infrastructure to process a requested transaction, the bank may transmit a phantom ACK to the requesting client before actually establishing the infrastructure for the requesting client. The map may show that each component of a requested a multi-step transaction has been deployed or established for other clients.

In response to receiving a transaction request, methods may include determining whether at least one of the connections in the map utilizes infrastructure for processing the transaction request on behalf of the currently requesting client.

When the map does not include the desired infrastructure, methods may include suspending transmission of the phantom ACK. The bank may conduct a feasibility evaluation of establishing the desired infrastructure before transmitting a phantom ACK or an actual ACK to the requesting client.

Infrastructure may include a connection linking the requesting client to at least one of: an automated clearing house payment network, a credit card processing network, a wire transfer network and/or a check clearing network.

The bank may provide the requesting client access to the infrastructure via the user interface of an online banking portal.

Methods may include using a first receiver, receiving a request for access to a transaction service or protocol. The request may be received from a client via the online portal. The request may be received by a customer service representative of the bank.

Methods may include using a second receiver, receiving a test file comprising a transaction request. Using a processor, methods may include generating a dictionary based on contents of the test file. For example, a client may transmit a file that includes a transaction request in a client specific format. The portal and/or payment networks may expect a transaction request in a different format.

Based on the contents of the client's file, methods may include formulating a transaction request on behalf of the client. The formulated transaction request may be formed using a syntax expected by the bank and/or payment networks. The dictionary may codify relationships between the contents of the client's file and syntax expected by a payment network.

A file received from a client may be a test file. The test file may include exemplary content and/or formatting used by the client. The client's exemplary content and/or formatting may be used to generate the dictionary. The dictionary may be used to formulate a test transaction request in the syntax and/or formatting expected by the bank and/or payment networks.

Methods may include executing the transaction request formulated using the syntax expected by the bank and/or payment networks. In response to successfully formulating the transaction request using the syntax, methods may include transmitting an ACK to the client.

Methods may include executing the test transaction request. Methods may include, using the second receiver, receiving confirmation from the client that the test transaction request has been successfully executed. Executing a test transaction request may include withdrawing or depositing an amount of funds into an account of the client. The amount may be a randomly selected amount less than two-dollars. The account number may be identified in the dictionary. Confirmation by the client may include the client confirming the amount of the micro deposit.

In response to receiving confirmation, the client may be invited to transmit a second electronic file. Methods may include using a receiver, receiving the second electronic file from the client.

The second file may include a transaction request the client wishes to process. Methods may include reformulating the transaction request received from the client based on the contents of a second electronic file. Methods may include reformulated the transaction request using the dictionary generated based on a client's previous transaction requests.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention. Methods of the above-referenced embodiments may involve the use of any combination of methods, portions of methods, partially executed methods, elements, one or more steps, computer-executable instructions, or computer-readable data structures disclosed herein.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
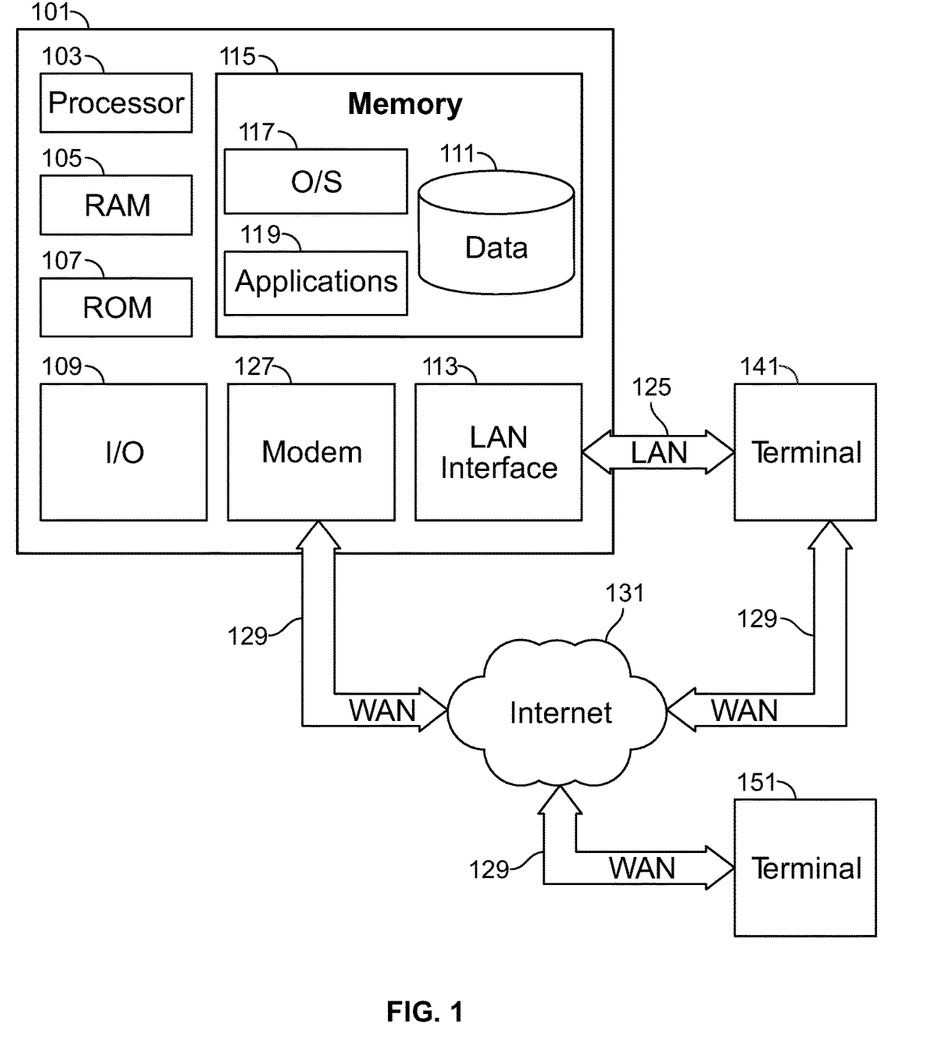
FIG. 1 shows an illustrative apparatus in accordance with principles of the invention.

FIG. 1 is a block diagram that illustrates a computing device 101 (alternatively referred to herein as a "server" or "computer") that may be used according to an illustrative embodiment of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network ("LAN") 125 and a wide area network ("WAN") 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131.

For example, clients and/or the portal may receive and/or transmit transaction information to a remote server over a WAN or LAN. The remote server may transmit the transaction to a payment network.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service ("SMS"), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms for examining transaction requests, identifying infrastructure for processing the transaction requests, examining syntax of the requests and/or establishing connections to one or more payment networks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
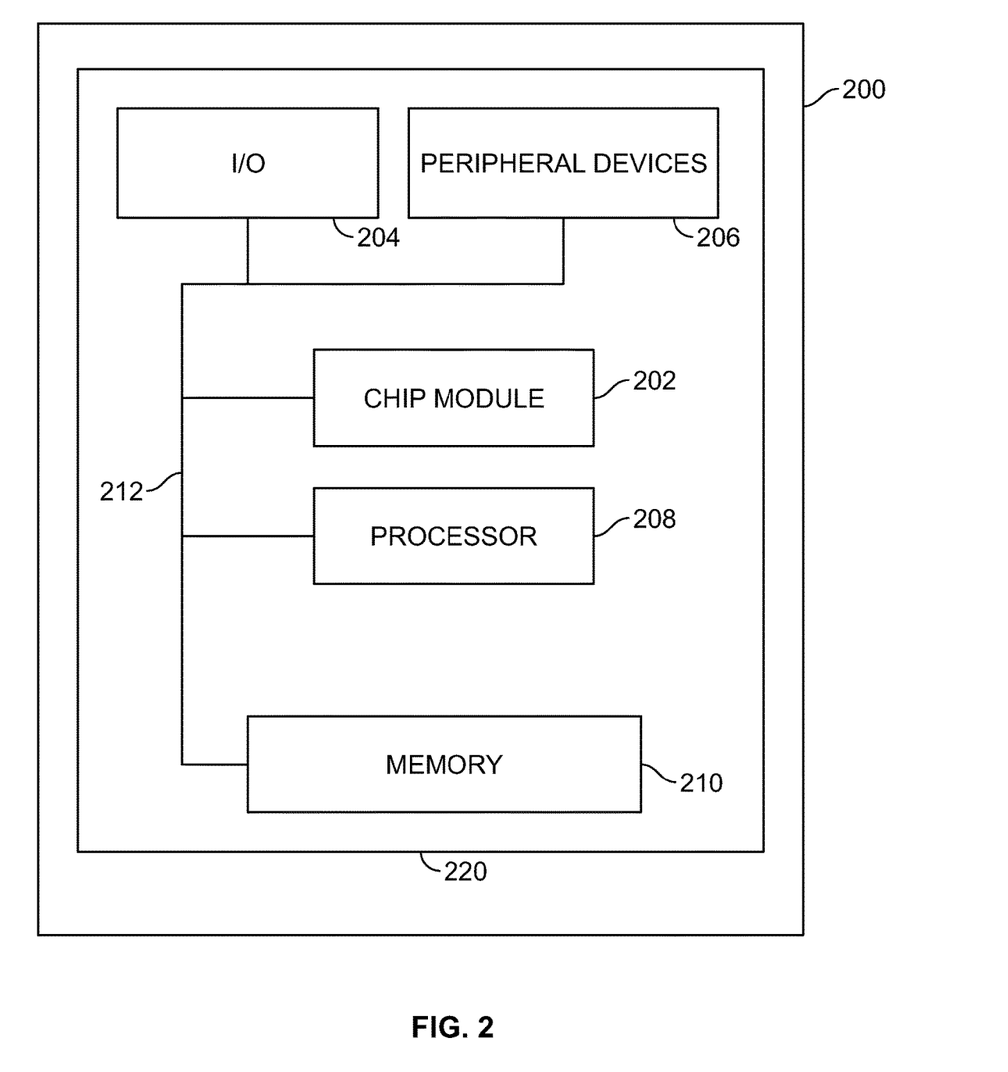
FIG. 2 shows an illustrative apparatus in accordance with the principles of the invention.

FIG. 2 shows an illustrative apparatus that may be configured in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, quantify indices; and machine-readable memory 210.

Machine-readable memory 210 may be configured to store in machine-readable data structures: infrastructure maps, client user interface settings, transaction requests, computer code and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
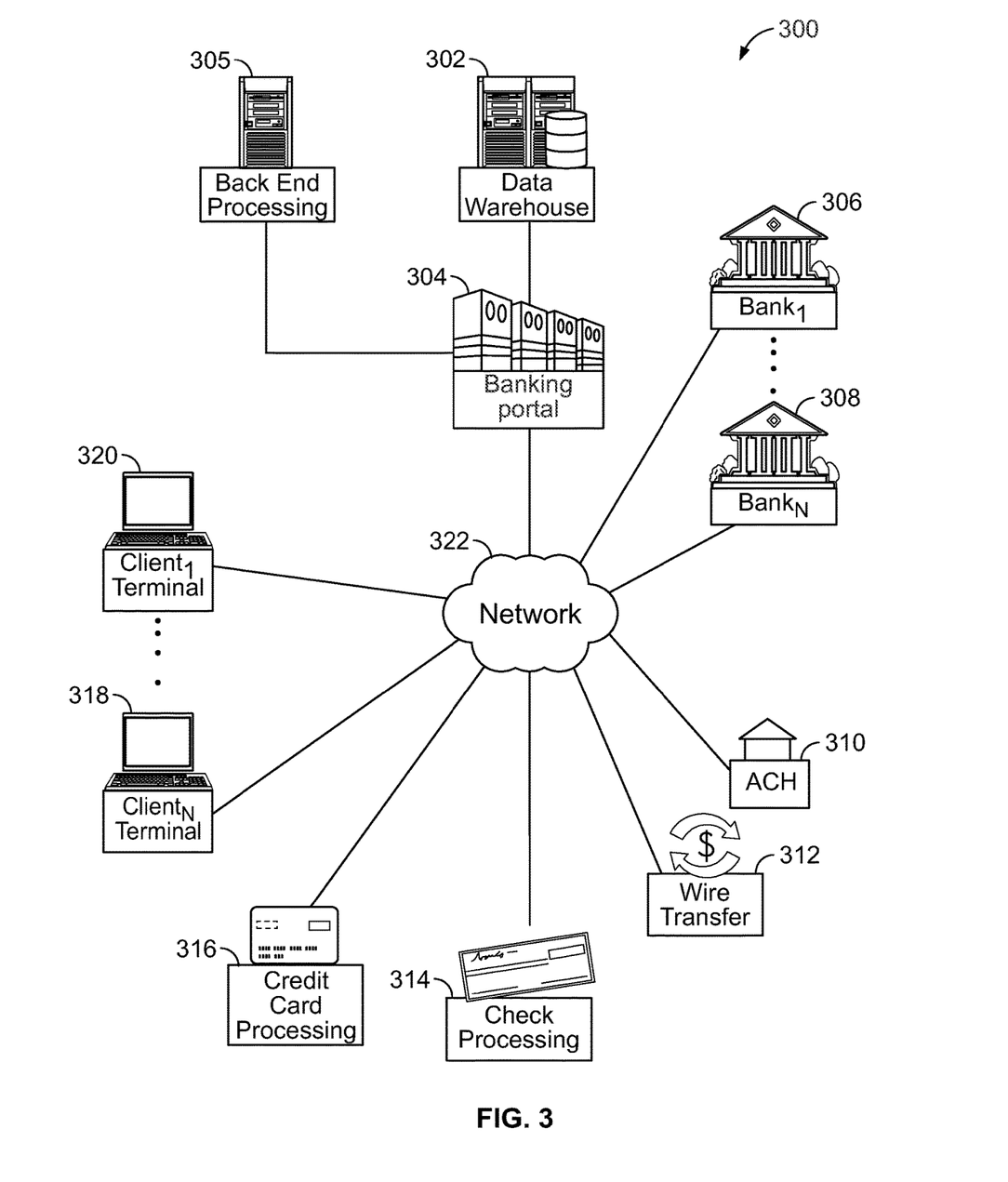
FIG. 3 shows an illustrative architecture in accordance with the principles of the invention.

FIG. 3 shows illustrative architecture 300. Architecture 300 includes banking portal 304. Banking portal 304 may interact with data warehouse 302. Data warehouse 302 may store user interface profiles. Data warehouse 302 may store transaction requests. User interfaces profiles may be utilized by clients 320 and 318 to access banking portal 304 over network 322. Each user interface profile may be associated with one or more connections to a payment network.

Architecture 300 shows illustrative payment networks 310, 312, 314 and 316. Banking portal 304 may communicate with payment networks over network 322.

Payment network 310 may be utilized to process automated clearing house ("ACH") transactions. Payment network 312 may be utilized to process wire transfers. Payment network 314 may be utilized to process checks. Check processing may include clearing and/or settlement of checks. Payment network 316 may be utilized to process credit card transactions. Credit card processing networks may link merchants, acquirers and issuers. Payment network 316 may be utilized to authorize and/or settle credit card transactions.

Payment networks 310, 312, 314 and 316 may link banks 306 and 308. Each of banks 306 and 308 may hold funds belonging to clients 320 and 318. Each of banks 306 and 308 may represent a source/destination of funds transferred in a transaction request submitted to banking portal 304.

Each of clients 320 and 318 may wish to access one or more payment networks 310, 312, 314 and 316 to process a transaction. Each of payment networks 310, 312, 314 and 316 may expect a transaction request to be submitting using specific syntax and/or formatting. To access one or more of payment networks 310, 312, 314 and 316 using banking portal 304, a connection, or other infrastructure may be established. The infrastructure may be established by changing a setting of a user profile utilized by clients 320 or 318.

Figure 4:
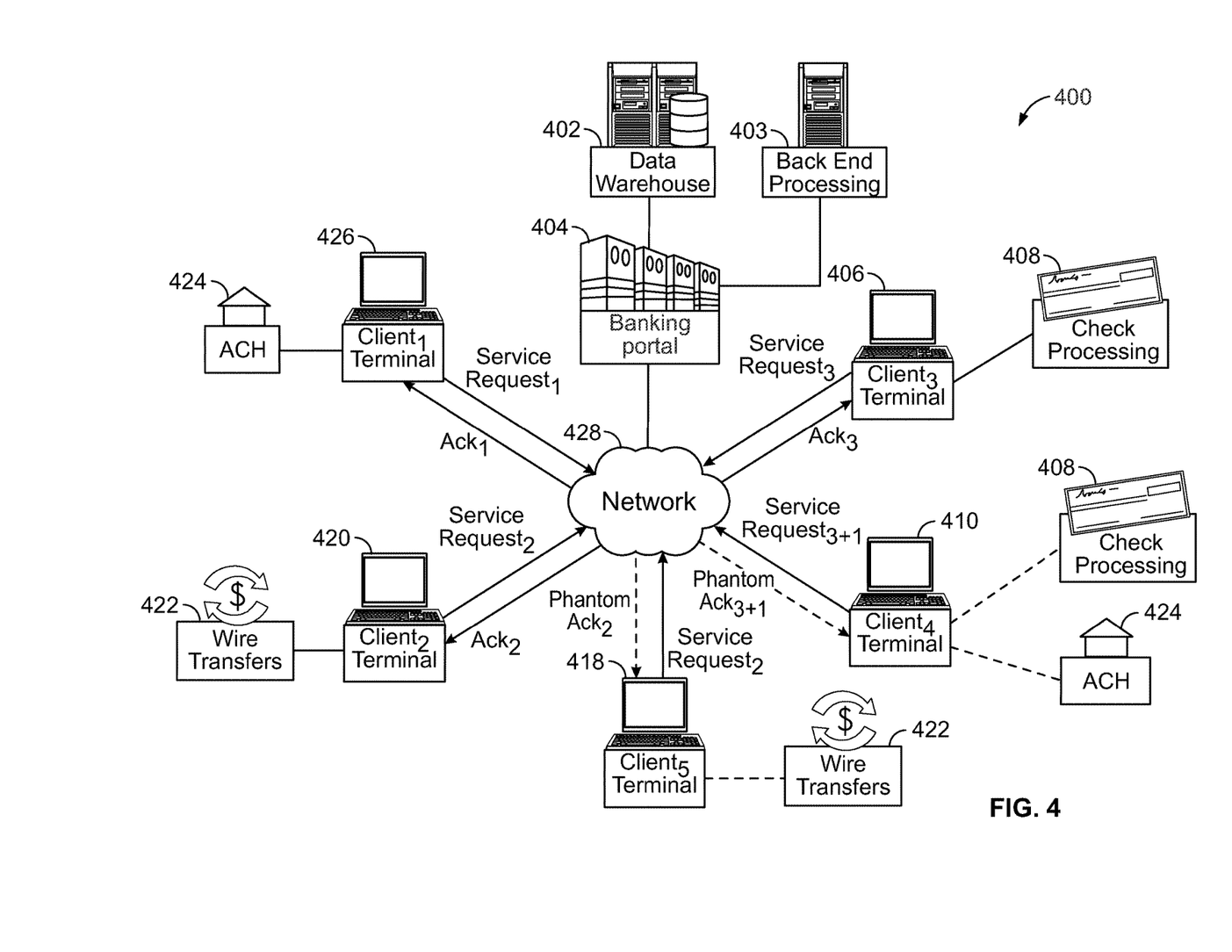
FIG. 4 shows an illustrative arrangement in accordance with the principles of the invention.

FIG. 4 shows illustrative arrangement 400. Arrangement 400 shows illustrative connections that have been established for clients to access a payment network. For example, arrangement 400 shows that a connection has been established between client 426 and payment network 424. Client 426 may submit service request$_1$ to banking portal 404 over network 428. After receiving service request$_1$, banking portal 404 may issue ACK$_1$ to client 426. Banking portal 404 may issue ACK$_1$ in response to confirming existence of the connection to payment network 424.

As a further example, arrangement 400 shows that a connection has been established between client 420 and payment network 422. Client 420 may submit service request$_2$ to banking portal 404 over network 428. After receiving service request$_2$, banking portal 404 may issue ACK$_2$ to client 420. Banking portal 404 may issue ACK$_2$ in response to confirming existence of the connection between client 420 and payment network 422.

As a further example, arrangement 400 shows that a connection has been established between client 406 and payment network 408. Client 406 may submit service request$_3$ to banking portal 404 over network 428. After receiving service request$_3$, banking portal 404 may issue ACK$_3$ to client 420. Banking portal 404 may issue ACK$_3$ in response to confirming existence of the connection between client 406 and payment network 408.

Arrangement 400 shows that client 410 may submit service request$_{3+1}$ to banking portal 404 over network 428. Service request$_{3+1}$ may request access to payment networks 408 and 424. Client 410 may not have an established connection to payment network 408. Client 410 may not have an established connection to payment network 424.

Back-end processing 403 may determine that client 406 has an established connection to payment network 408. Back-end processing 403 may determine that client 426 has an established connection to payment network 424. Back-end processing 403 may therefore determine that it is feasible to establish a connection to payment networks 408 and 424 on behalf of client 410.

After back-end processing 403 determines the feasibility of establishing the connection on behalf of client 410, phantom ACK$_{3+1}$ may be transmitted to client 410. After transmitting phantom ACK$_{3+1}$ to client 410, the desired connection may be established and the requested transaction executed on behalf of client 410.

Client 418 may submit service request$_2$ to banking portal 404 over network 428. Service request$_2$ may request access to payment network 422. Client 418 may not have an established connection to payment network 422.

Back-end processing 403 may determine that client 420 has an established connection to payment network 422. Back-end processing 403 may therefore determine that it is feasible to establish a connection to payment network 422 on behalf of client 418.

After back-end processing 403 determines the feasibility of establishing the connection on behalf of client 418, phantom ACK$_2$ may be transmitted to client 418. After transmitting phantom ACK$_2$ to client 418, the desired connection may be established and the requested transaction executed on behalf of client 418.

In some embodiments the phantom ACK transmitted to client 418 may include information different from information in the ACK transmitted to client 420. In some embodiments the phantom ACK transmitted to client 418 may include information similar or identical to information in the ACK transmitted to client 420.

Figure 5:
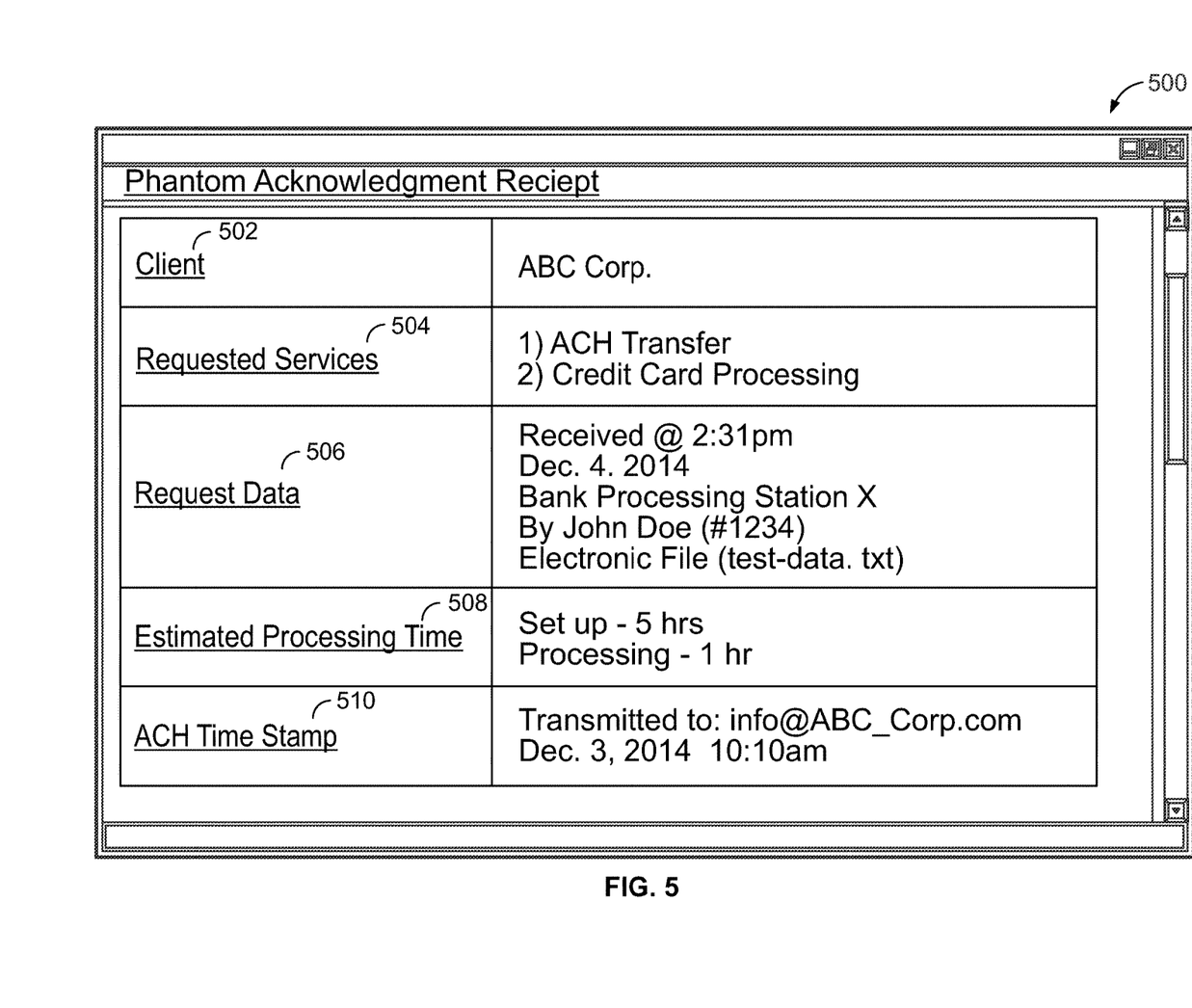
FIG. 5 shows illustrative information in accordance with the principles of the invention.

FIG. 5 shows illustrative phantom ACK 500. Phantom ACK 500 may be issued by a banking portal such as banking portal 304 (shown in FIG. 3) or banking portal 404 (shown in FIG. 4). Back end processing 305 or back end processing 403 may determine when to issue a phantom ACK.

Phantom ACK 500 includes client name 502. Phantom ACK 500 includes requested services 504. Requested services 504 include a request to access an ACH payment network and credit card processing payment network.

Phantom ACK 500 includes request data 506. Request data 506 includes details regarding the transaction request submitted by client 502. Request data 506 shows a time and date the transaction request was received. Request data 506 shows the bank representative that authorized the client to transmit the transaction request.

For example, in a telephone call a customer service representative of a bank may authorize client 502 to submit a transaction request. Request data 506 shows attributes of the file used by client 502 to submit the transaction request.

Phantom ACK 500 includes estimated processing time 508. Phantom ACK 500 shows that 5 hours has been allotted to "set-up" or establish infrastructure for processing the transaction request. Phantom ACK 500 also shows that after the "set-up" time, it will take one-hour to process the transaction request.

Phantom ACK 500 shows ACK time stamp 510. ACK time stamp 510 includes the time/date when phantom ACK 500 was transmitted to client 502. ACK time stamp 510 also shows how phantom ACK 500 was transmitted to client 502.

Figure 6A:
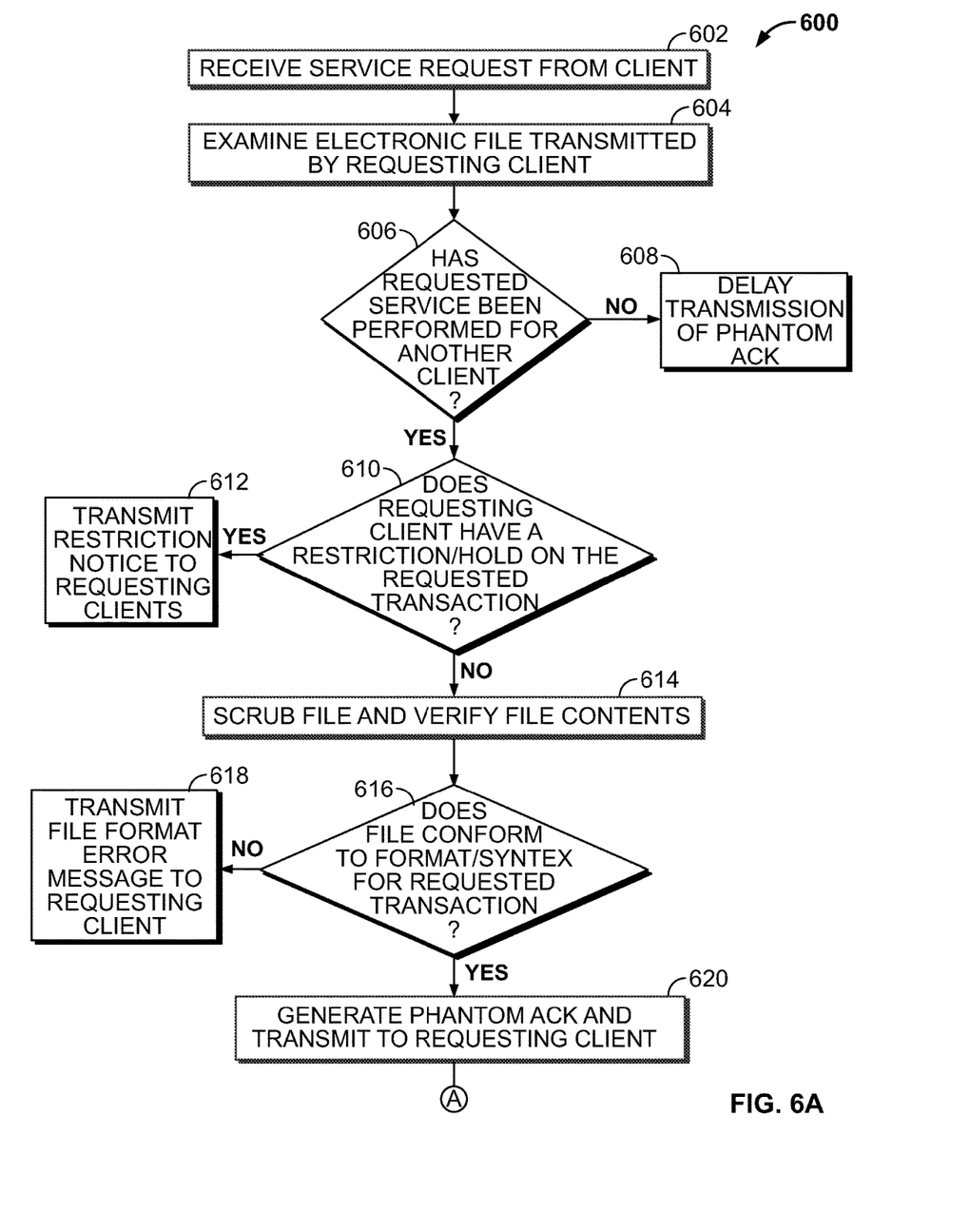
FIGS. 6A and 6B show an illustrative process in accordance with the principles of the invention.
Figure 6B:
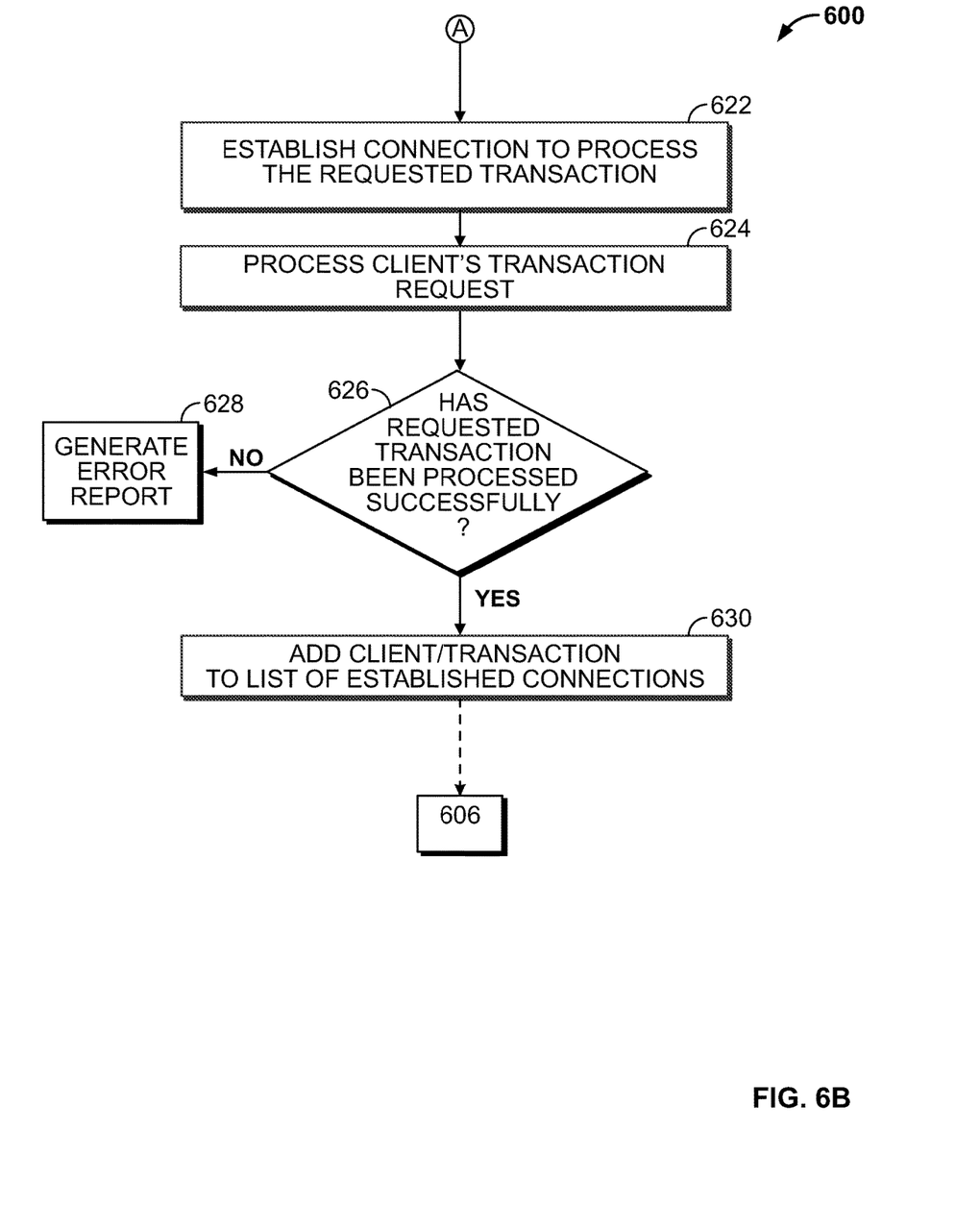

FIG. 6 shows illustrative process 600. For the sake of illustration, one or more of the steps of the process illustrated in FIG. 6 will be described as being performed by a "system." The "system" may include one or more of the features of the apparatus, arrangements, information or processes shown in FIGS. 1-5 and/or any other suitable device or approach. The "system" may be provided by an entity. The entity may be an individual, an organization or any other suitable entity.

Process 600 may being at step 602. At step 602, the system receives a transaction request from a client. The system may receive the request in response to an invitation by a customer service representative of a bank. The client may contact the representative and inquire about a banking service. The representative may instruct the client to transmit an electronic file that includes one or more transaction requests.

At step 604, the system examines the electronic file transmitted by the client. At step 606, the system determines whether the transaction request has been performed for another client. At step 606, the system may also determine whether infrastructure for processing the transaction request has been established for another client. If the transaction request has not been performed for another client, at step 608, the system delays transmission of a phantom ACK. In some embodiments, the system may suspend transmission of a phantom ACK until the system assesses a feasibility of establishing infrastructure to process the currently requested transaction.

If the system determines that the requested transaction has been performed for another client, at step 610 the system determines whether the requesting client has a hold or other restriction on the transaction request. For example, some transactions may be restricted as a result of government regulation or a fee requirement.

If the requested transaction is restricted, at step 612, the system may transmit a restriction notice to the requesting client. The restriction notice may inform the client that the requested transaction is restricted. The restriction notice may inform the requesting client how to remove the restriction.

If no restriction is associated with the requested transaction, at step 614, the system scrubs the file and verifies the contents. The scrubbing may include generating a dictionary based on content of the file. In some embodiments, the system may repackage terms used by the client in the electronic file. The terms may be repackaged to conform to syntax expected by a payment network for processing the requested transaction. In some embodiments, the transaction request may be received formatted as expected by the payment network. The system may verify that the syntax used in the client's file conforms to the syntax expected by the payment network.

At step 616, the system determines whether the transaction request is properly formatted. If the system is unable to determine the proper syntax/formatting at step 618, the system transmits an error message to the requesting client. If the system is able to confirm that the transaction request uses expected syntax/formatting for processing the request, at step 620 the system generates and transmits a phantom ACK to the requesting client. The phantom ACK may include one or more features of phantom ACK 500 (shown in FIG. 5).

At step 622, after transmitting the phantom ACK, the system establishes a connection between the requesting client and requested transaction. The connection may include providing the client access to a payment network via an online banking profile. The connection may include back-end processing to enable the client to regularly process the requested transaction. The connection may include providing adding a software "socket" to the client's user interface or any other suitable infrastructure for processing the transaction request.

At step 624, the system processes the client's transaction request. At step 626, the system evaluates whether the requested transaction has been processed successfully. At step 628, if the transaction has not been successfully processed, an error report is generated. At step 630, if the transaction has been successfully processed, the client and requested transaction are added to a list of successfully processed transactions. Optionally, step 630 may provide feedback utilized at step 606. When another client submits a transaction request, the system searches previously established infrastructure to determine whether the requested transaction may be performed for the currently requesting client.

Figure 7:
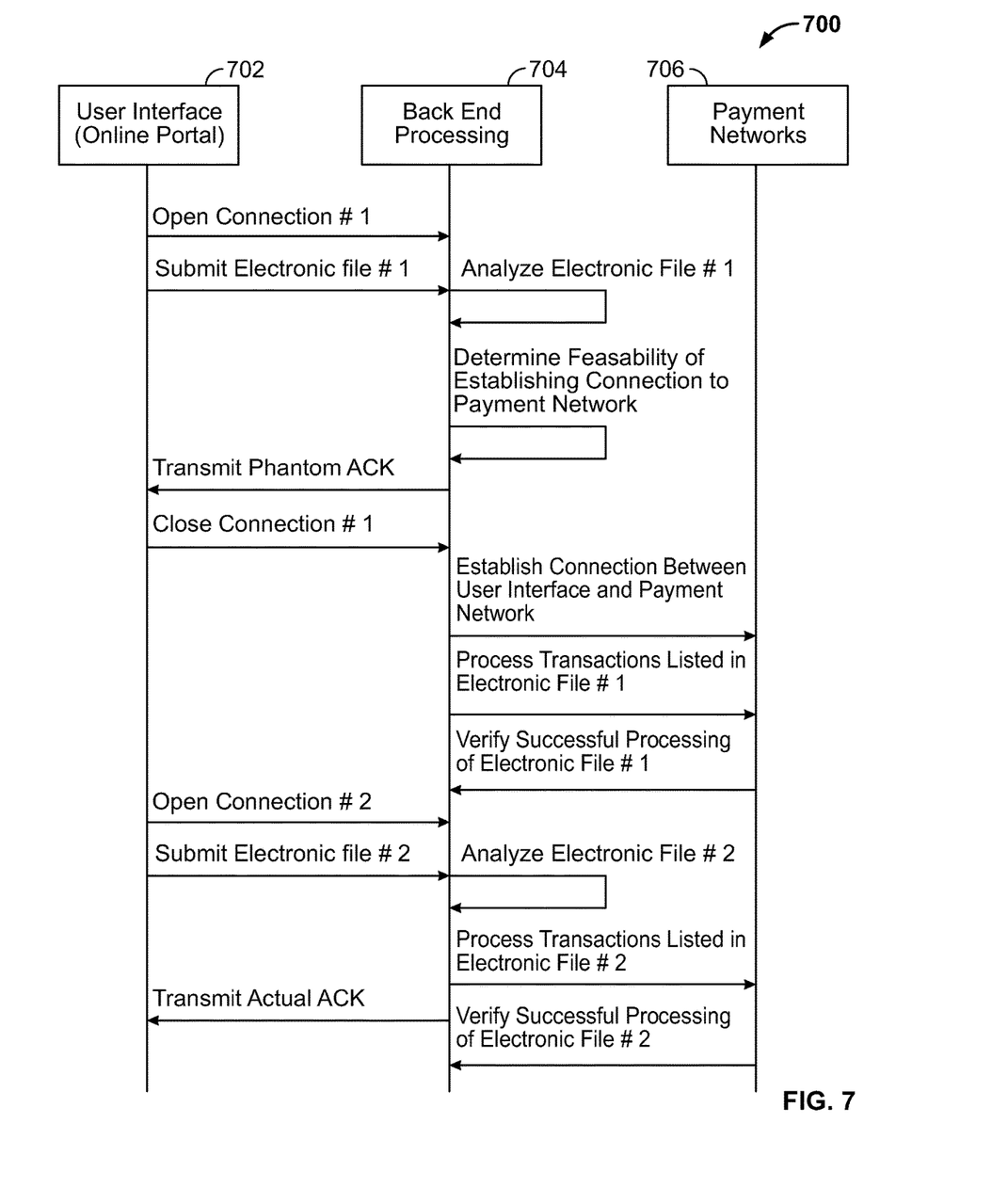
FIG. 7 shows an illustrative process in accordance with the principles of the invention.

FIG. 7 shows illustrative process flow 700. Process flow 700 may begin when a requesting client opens connection #1 to back-end processing 704 via online banking portal 702. Using online portal 702, the client may submit an electronic file to back end processing 704. The submitted file may include a request for one or more transaction services.

Back end processing 704 may analyze the submitted file. The analysis may include applying one or more of an examination algorithm, a scrubbing and/or a syntax algorithm. Based on a result of the analysis, back end processing 704 may determine a feasibility of establishing a connection or other infrastructure to one or more payment networks. The connection may allow the client to regularly request the transaction service using the online portal.

In response to determining that it would be feasible to establish a connection to the payment network, back end processing 704 transmits a phantom ACK to the requesting client via online portal 702. The phantom ACK may provide a commitment from a bank to process the transaction request. The commitment may provide a timetable for completing processing of the requested transaction. After the phantom ACK is transmitted to the requesting client, connection #1 is closed.

After connection #1 is closed, back end processing 704 may establish infrastructure to process the transaction request. After establishing the infrastructure, back end processing 704 may begin to process the requested transactions listed in file #1. Processing the requested transactions may include submitting the transactions to payment network 706 via the established infrastructure. Payment network 706 may verify that the requested transaction has been successfully processed.

A client may open connection #2 to online portal 702. The client may submit an electronic file that includes a transaction request. Back end processing 704 may detect that infrastructure has already been established to process the requested transactions on behalf of the client. Back end processing 704 may begin processing the requested transactions. Back end processing 704 may transmit an actual ACK to the requesting client. The actual ACK may provide a commitment from a bank to complete processing of the requested transactions. Back end processing 704 may receive confirmation from payment network 706 when the transactions have been successfully processed.

Thus, methods and apparatus for pre-provisioning an electronic banking file have been provided. Persons skilled in the art will appreciate that the present invention can be practiced by other than the described embodiments, which are presented for purposes of illustration rather than of limitation. The present invention is limited only by the claims that follow.

What is claimed is:

1. An article of manufacture comprising a non-transitory computer usable medium having computer readable program code embodied therein, the code when executed by a processor causes a computer to perform a method for pre-provisioning test data across a plurality of banking products and across a plurality of banking protocols, the computer readable program code in said article comprising computer readable program code for causing the computer to:

receive a request from a client to initiate a transaction using an online banking portal, the request comprising an electronic file transfer;

in response to receiving the request, determine whether, prior to receiving the request, infrastructure has been established to process the transaction on behalf of the client via the portal, wherein establishing infrastructure comprises configuring the online portal for access to an external or hybrid payment network associated with the transaction, the determination comprising:

using a first algorithm, identifying a requested transaction from the electronic file based at least in part on the file syntax;

using a second algorithm, identifying a payment network associated with the requested transaction; and determining whether the client has previously accessed the payment network via the online portal;

when the infrastructure has been established prior to receiving the request;

transmit an actual acknowledgement ("actual ACK") to the client, said actual ACK that displays a first time to respond; and initiate the requested transaction; and when the infrastructure has not been established prior to receiving the request:

evaluate a feasibility of establishing the infrastructure, the evaluation based at least in part on one or more prior transactions requested by a different client;

based on the evaluation, transmit a phantom acknowledgement ("phantom ACK") to the client, wherein the appearance of the phantom ACK is identical to the appearance of the actual ACK, with the exception that the phantom ACK displays a second time to respond, wherein the second time to respond comprises a magnitude that is at least two times greater than the first time to respond;

after transmitting the phantom ACK to the client, establish infrastructure to process the requested banking transaction, the establishing comprising configuring the online portal for access to the payment network; and after establishing the infrastructure, initiate the requested transaction; and when the client is a first client and the first client has not processed the requested transaction using the portal, further comprising computer readable program code for causing the computer to:

determine whether the infrastructure has been established on behalf of a second client;

transmit the phantom ACK when the infrastructure has been established on behalf of the second client; and when the infrastructure has not been established on behalf of the second client:

suspend transmission of the phantom ACK;

establish the infrastructure on behalf of the first client; and after the establishing the infrastructure, transmit an actual ACK to the client.

2. The article of claim 1 wherein establishing the infrastructure comprises computer readable program code for causing the computer to provide access, from a user interface of the first client, to one or more payment networks.

3. The article of claim 1 further comprising computer readable program code for causing the computer to, before transmitting the phantom ACK:

identify one or more payment networks for processing the requested transaction; and for each identified payment network, verify syntax of a portion of the requested transaction associated with the payment network.

4. The article of claim 1 wherein the requesting client is one of a plurality of clients and the payment network is one of a plurality of payment networks, further comprising computer readable program code for causing the computer to:

generate a map of connections linking the plurality of payment networks that are accessible to the plurality of clients;

in response to receiving the requested banking transaction determine whether at least one of the connections in the map provides the infrastructure to process the requested transaction on behalf of the requesting client;

when at least one of the connections in the map provides the infrastructure, transmit a phantom ACK to the requesting client; and when none of the connections in the map provides the infrastructure, suspend transmission of the phantom ACK.

5. The article of claim 1 wherein the infrastructure provides the requesting client access to at least one of:

an automated clearing house payment network;
a credit card processing network;
a wire transfer network; and
a check clearing network.

* * * * *